US008165531B2

(12) United States Patent
Nikolova et al.

(10) Patent No.: US 8,165,531 B2
(45) Date of Patent: Apr. 24, 2012

(54) ELECTROMAGNETIC WAVE-POTENTIAL COMMUNICATION SYSTEM

(75) Inventors: Natalia K. Nikolova, Hamilton (CA); Robert K. Zimmerman, Jr., Bayamon, PR (US)

(73) Assignee: McMaster University, Hamilton, Ontario (CA)

( * ) Notice: Subject to any disclaimer, the term of this patent is extended or adjusted under 35 U.S.C. 154(b) by 854 days.

(21) Appl. No.: 12/184,700

(22) Filed: Aug. 1, 2008

(65) Prior Publication Data

US 2009/0034657 A1 Feb. 5, 2009

Related U.S. Application Data

(60) Provisional application No. 60/957,192, filed on Aug. 22, 2007, provisional application No. 60/953,773, filed on Aug. 3, 2007.

(51) Int. Cl.
*H04B 17/00* (2006.01)
*H04W 72/00* (2009.01)

(52) U.S. Cl. ...................... 455/67.15; 455/454; 455/269

(58) Field of Classification Search ............... 455/67.15, 455/454, 899, 269, 286, 39
See application file for complete search history.

(56) References Cited

U.S. PATENT DOCUMENTS 4,429,280 A 1/1984 Gelinas
4,429,288 A 1/1984 Gelinas
4,432,098 A 2/1984 Gelinas
4,447,779 A 5/1984 Gelinas
4,491,795 A 1/1985 Gelinas
4,605,897 A 8/1986 Gelinas
5,370,765 A * 12/1994 Dandl ............................ 216/69
5,707,452 A * 1/1998 Dandl .................. 118/723 MW
5,845,220 A 12/1998 Puthoff
5,975,014 A * 11/1999 Dandl .................. 118/723 MW

OTHER PUBLICATIONS

N.K. Georgieva and W.S. Weighofer, Electromagnetic vector potentials in isotropic non-homogeneous materials: mode equivalent and scalarisation, Jun. 2003, IEE Proc-Microw. Propag., vol. 150, No. 3, pp. 164-170.*

Y. Aharonov and D. Bohm, "Significance of the electromagnetic potentials in the quantum theory," The Physical Review, vol. 115, No. 3, Aug. 1959, pp. 485-491.

R. G. Chambers, "Shift of an electron interference pattern by enclosed magnetic flux," Physical Review Letters, vol. 5, No. 1, Jul. 1960, pp. 3-5.

B. Lee, E. Yin, T. K. Gustafson, and R. Chiao, "Analysis of Aharonov-Bohm effect due to time-dependent vector potentials," Physical Review A, vol. 45, No. 7, Apr. 1992, pp. 4319-4325.

B. D. Josephson, "Coupled superconductors," Review of Modern Physics, vol. 36, Jan. 1964, pp. 216-220.

G. G. Lister, J. E. Lawler, W. P. Lapatovich, and V. A. Godyak, "The physics of discharge lamps," Reviews of Modern Physics, vol. 76, Apr. 2004, pp. 541-598.

K. H. Loo, G. J. Moss, R. C. Tozer, D. A. Stone, M. Jinno, and R. Devonshire, "A dynamic collisional-radiative model of a low-pressure mercury-argon discharge lamp: a physical approach to modeling fluorescent lamps for circuit simulations," IEEE Trans. Power Electronics, vol. 19, No. 4, Jul. 2004, pp. 1117-1129.

Capt. Robert M. Collins (TQTR), "Soviet Research on the A-Vector Potential and Scalar Waves (U),"(http://www.unusualresearch.com/scalarbib/djvu/SovietApotential.djvu), 10 pages.

* cited by examiner

*Primary Examiner* — Sonny Trinh

(57) ABSTRACT

A wave-potential detector and a wave-potential radiator are provided that detect and radiate wave-potential signals having longitudinally polarized A vectors, respectively. Wave-potential receivers and transmitters incorporating the wave-potential detector and wave-potential radiator, respectively, are also provided. The wave-potential detector includes a biased plasma device, having at least a portion of its bias current that is parallel to the direction of propagation of a wave-potential signal having a longitudinally polarized A vector. Both omnidirectional and directive wave-potential radiators are provided.

24 Claims, 7 Drawing Sheets

ELECTROMAGNETIC WAVE-POTENTIAL COMMUNICATION SYSTEM

RELATED APPLICATIONS

This application claims the benefit of prior U.S. provisional application No. 60/953,773 filed Aug. 3, 2007 and prior U.S. provisional application No. 60/957,192 filed Aug. 22, 2007, which are hereby incorporated by reference in their entireties.

FIELD OF THE INVENTION

The present invention pertains to electromagnetic communication systems.

BACKGROUND OF THE INVENTION

Conventional RF and microwave long-distance communication systems are capable of receiving only signals whose field vectors E and B are nonzero, i.e., signals which carry real electromagnetic power as described by the Poynting vector. There are cases, however, where, for a particular antenna or another type of electromagnetic source, the field force vectors can be reduced to zero in parts or sectors of space (or even all space) while the components of the 4-vector potential (the magnetic vector potential A and the electric scalar potential Φ) are significantly different from zero.

The detection of the static magnetic vector potential A has been experimentally confirmed in quantum electrodynamics through the Aharonov-Bohm effect, as described by Y. Aharonov and D. Bohm, "Significance of the electromagnetic potentials in the quantum theory," *The Physical Review*, vol. 115, No. 3, August 1959, pp. 485-491, which is hereby incorporated by reference in its entirety, in systems involving an electron beam passing through a double-slit with a magnetized hair-thin ferromagnetic filament in-between the slits. A shift in the electron interference pattern is observed with the filament in and out of the double-slit arrangement, as described in R. G. Chambers, "Shift of an electron interference pattern by enclosed magnetic flux," *Physical Review Letters*, vol. 5, No. 1, July 1960, pp. 3-5, which is hereby incorporated by reference in its entirety. There is a substantial body of literature dedicated to the detection of the magnetic vector potential A due to magnetostatic sources (coils, toroids, magnetized ferromagnetic cores, etc.) in regions of space where the magnetic field vector B is zero, see, for example, M. Peshkin and A. Tonomura, *The Aharonov-Bohm Effect*, Lecture Notes in Physics, vol. 340, Springer-Verlag, Berlin, 1989, which is hereby incorporated by reference in its entirety. Similarly, electrostatic arrangements have been investigated where the effect of the scalar potential Φ is measurable in regions where the electric field vector E is zero, see Y. Aharonov and D. Bohm, "Significance of the electromagnetic potentials in the quantum theory," and M. Peshkin and A. Tonomura, *The Aharonov-Bohm Effect*. In all cases, the effect is quantum or microscopic in the sense that it is observed through electron beam interference. To date, there are no successful A-detection experiments in the classical macroscopic sense involving time-varying signals, e.g., radio-frequency or microwave signals. A theoretical analysis of the time-dependent Aharonov-Bohm effect is presented in B. Lee, E. Yin, T. K. Gustafson, and R. Chiao, "Analysis of Aharonov-Bohm effect due to time-dependent vector potentials," *Physical Review A*, vol. 45, No. 7, April 1992, pp. 4319-4325, which is hereby incorporated by reference in its entirety, for the case of optical frequencies and a possible experimental setup is outlined, which is based again on electron beam interference. However, there is no published data on the realization of this optical experiment. To date, there is no known technology reported in the scientific and engineering literature, which can unambiguously prove that the coupled electrodynamic potentials A and Φ (often referred to as the 4-vector potential) have any physical significance, i.e., that they are measurable. This holds for both microscopic observations such as electron interference patterns as well as macroscopic observations such as the measurements of voltage, current or power signals.

The detection of static curl-free magnetic vector potential A, i.e., curlA=0, where the magnetic field vector B is zero since B=curlA, has already been considered in practical systems discussed in U.S. Pat. No. 4,432,098 to Gelinas and U.S. Pat. No. 4,491,795 to Gelinas, which are both hereby incorporated by reference in their entirety. The detection devices utilize a single Josephson junction (U.S. Pat. No. 4,432,098) and a quantum interferometer (U.S. Pat. No. 4,491,795) consisting of two Josephson junctions. The latter belongs to a group of devices commonly referred to as superconducting quantum interference devices (SQUIDs). The way Josephson junctions, as described in B. D. Josephson, "Coupled superconductors," *Review of Modern Physics*, vol. 36, January 1964, pp. 216-220, which is hereby incorporated by reference in its entirety, and SQUIDs respond to the magnetic vector potential A is well understood, see, for example, M. Tinkham, *Introduction to Superconductivity*, $2^{nd}$ ed., Mc-Graw-Hill, 1996, Chapters 6 and 7, which is hereby incorporated by reference in its entirety. Their major drawback is that they require a cryogenic environment in order to achieve the superconducting state. In U.S. Pat. No. 4,432,098, transfer of information utilizing such signals is also proposed, but no practical communication system for implementing such a transfer is disclosed.

Further, U.S. Pat. No. 5,845,220 to Puthoff, which is hereby incorporated by reference in its entirety, describes communicating through time-varying 'pure potential' (zero-field) signals where the receiver is again a Josephson junction. Here, the junction is placed within an electromagnetic shield in addition to the required cryogenic chamber. The electromagnetic shield supposedly is pervious to the pure-potential signals while eliminating interference from conventional (E,B) signals. The proposed system uses a transmission device, which is quasi-static in nature, and whose signals are to be detected in the device's near zone, which severely limits the distance over which the signals can be detected. Moreover, the device generates a vector potential A, whose polarization is orthogonal to the direction of the signal's propagation. Such a design principle leads to a substantial conventional (E,B) signal in the far zone compared to the pure-potential signal, thereby inevitably leading to substantial power consumption and, possibly, interference.

SUMMARY OF THE INVENTION

According to one broad aspect of the present invention, there is provided a wave-potential receiver comprising: a wave-potential detector comprising at least one biased plasma device configured to operate with a current with at least a portion of the current substantially parallel to a direction of propagation of a wave-potential signal having a longitudinally polarized A vector; and radio receiver circuitry that processes a received signal induced in the wave-potential detector by the wave-potential signal.

In some embodiments, the at least one biased plasma device has a longitudinal length less than the wavelength of the wave-potential signal.

In some embodiments, the at least one biased plasma device comprises a biased plasma tube, and the current comprises a DC bias current that biases the plasma tube.

In some embodiments, the biased plasma tube has a first end and a second end and the DC bias current flows from the first end to the second end on a first path and returns from the second end to the first end on a separate return path.

In some embodiments, the separate return path comprises two separate return paths located symmetrically on opposite sides of the biased plasma tube.

In some embodiments, the wave-potential receiver further comprises a shielded co-axial connector comprising a central conductor and a shield, wherein the first end of the biased plasma tube is connected to the central conductor of the shielded co-axial connector and the two separate return paths comprise electrical conductors connected between the second end of the biased plasma tube and the shield of the shielded co-axial connector.

In some embodiments, the at least one biased plasma device comprises a biased neon bulb comprising a first electrode and a second electrode having an axis therebetween, and the current comprises a DC bias current flowing along the axis between the first electrode and the second electrode.

In some embodiments, the at least one biased plasma device comprises a biased u-shaped plasma tube having a first leg and a second leg that are parallel to one another, each leg having a first end and a second end, wherein the second end of the first leg and the second end of the second leg are joined to form the u-shape, and the current comprises a DC bias current that flows from the first end of the first leg around the u-shaped plasma tube to the first end of the second leg.

In some embodiments, the wave-potential receiver further comprises a shielded co-axial connector comprising a central conductor and a shield, wherein the first end of the first leg is connected to the central conductor of the shielded co-axial connector and the first end of the second leg is connected to the shield of the shielded co-axial connector.

In some embodiments, the at least one biased plasma device comprises a second biased neon bulb having a first electrode and a second electrode having an axis therebetween, wherein the second electrode of the first biased neon bulb is electrically connected to the first electrode of the second biased neon bulb and the bulbs are spaced apart such that the DC bias current flows in a first direction from the first electrode of the first biased neon bulb to the second electrode of the first biased neon bulb and then in a second direction opposite to the first direction from the first electrode of the second biased neon bulb to the second electrode of the second biased neon bulb, the first direction and the second direction being parallel to the direction of propagation of the wave-potential signal when the wave-potential detector is oriented with respect to the direction of propagation of the wave-potential signal.

In some embodiments, the wave-potential receiver further comprises a balun to improve matching between the at least one biased plasma device and the radio receiver circuitry.

In some embodiments, the radio receiver circuitry switches the polarity of the current to the wave-potential detector between a first polarity and a second polarity and takes the difference between a received signal received during the first polarity from a received signal received during the second polarity to suppress real-power (E,B) signal interference.

In some embodiments, the wave-potential receiver further comprises a real-power (E,B) radio frequency antenna that detects real-power (E,B) radio frequency signals, wherein the radio receiver circuitry scales and subtracts any detected real-power (E,B) radio frequency signal received from the real-power (E,B) radio frequency antenna from the received signal from the wave-potential detector.

In some embodiments, the radio receiver circuitry down-converts, mixes and demodulates the received signal.

In some embodiments, the radio receiver circuitry also de-codes the received signal.

In some embodiments, the wave-potential receiver further comprises a current regulated power supply that supplies the current to the wave-potential detector.

In some embodiments, the wave-potential receiver further comprises a bias tee to apply the current from the current regulated power supply to the wave-potential detector and pass the received signal from the wave-potential detector to the radio receiver circuitry.

In some embodiments, the radio receiver circuitry controls the current regulated power supply to control the amount of current through the at least one biased plasma device and thus the strength of the received signal.

According to another broad aspect of the present invention, there is provided a wave-potential radiator comprising: an electrically conductive housing; at least one pair of diametrically opposed radial electrical conductors radiating out from a central point in the housing, the radial electrical conductors having a 3-dimensional symmetry; and a feed line connected to the central point that provides transmit signal drive current to each of the radial electrical conductors; wherein: the housing is grounded to the feed line; the wave-potential radiator is omnidirectional due to the 3-dimensional symmetry of the pairs of diametrically opposed radial electrical conductors; and the wave-potential radiator radiates a wave-potential signal having a longitudinally polarized A vector with far-zone (E,B) field vectors of essentially zero.

In some embodiments, each of the radial electrical conductors has a length less than the wavelength of the wave-potential signal.

In some embodiments, each of the radial electrical conductors is connected through a respective coaxial section at the central point.

In some embodiments, the housing is a symmetrical polyhedron and each of the radial electrical conductors radiate through a face of the symmetrical polyhedron housing.

In some embodiments, the housing is a symmetrical polyhedron and each of the radial electrical conductors radiate through a vertex of the symmetrical polyhedron housing.

In some embodiments, the housing is a symmetrical polyhedron and each of the radial electrical conductors radiate through an edge of the symmetrical polyhedron housing.

In some embodiments, the housing is spherically-shaped.

According to yet another broad aspect of the present invention, there is provided a wave-potential radiator comprising: a parabolic reflector; and a longitudinally oriented dipole with a center located at a focal point of the parabolic reflector; wherein the wave-potential radiator is directive and radiates a wave-potential signal having a longitudinally polarized A vector.

In some embodiments, the dipole is supported by non-conductive struts so that its center is located at the focal point of the parabolic reflector.

According to still another broad aspect of the present invention, there is provide a wave-potential transmitter, comprising: a wave-potential radiator as described above or below, wherein the wave-potential radiator has a low impedance; and radio transmitting circuitry that drives the low impedance wave-potential radiator.

In some embodiments, the radio transmitting circuitry comprises: radio transmitter circuitry that generates a transmission signal current; and a current-driving amplifier that amplifies the transmission signal current and drives the low impedance wave-potential radiator with the amplified transmission signal current.

In some embodiments, the wave-potential transmitter further comprises a signal source that provides a source signal to the radio transmitter circuitry, wherein the radio transmitter circuitry generates the transmission signal current based on the source signal.

According to still a further broad aspect of the present invention, there is provided a wave-potential communication system comprising: at least one wave-potential transmitter as described above or below; and at least one wave-potential receiver as described above or below.

According to yet a further broad aspect of the present invention, there is provided a method for detecting a wave-potential signal with a longitudinally polarized A vector comprising: detecting the wave-potential signal with at least one biased plasma device having a current with at least a portion of the current substantially parallel to a direction of propagation of the wave-potential signal.

In some embodiments: the at least one biased plasma device comprises a biased plasma tube; the current comprises a DC bias current; and detecting the wave-potential signal comprises detecting a radio frequency (RF) signal induced in the biased plasma tube by the wave-potential signal.

In some embodiments: the at least one biased plasma device comprises a biased neon bulb comprising a first electrode and a second electrode having an axis therebetween; the current comprises a DC bias current flowing along the axis between the first electrode and the second electrode; and detecting the wave-potential signal comprises detecting a radio frequency (RF) signal induced in the biased neon bulb by the wave-potential signal.

In some embodiments: the at least one biased plasma device comprises a biased u-shaped plasma tube having a first leg and a second leg that are parallel to one another, each leg having a first end and a second end, wherein the second end of the first leg and the second end of the second leg are joined to form the u-shape; the current comprises a DC bias current that flows from the first end of the first leg around the u-shaped plasma tube to the first end of the second leg; and detecting the wave-potential signal comprises detecting a radio frequency (RF) signal induced in the u-shaped plasma tube by the wave-potential signal.

In some embodiments: the at least one biased plasma device comprises a second biased neon bulb having a first electrode and a second electrode having an axis therebetween; the second electrode of the first biased neon bulb is electrically connected to the first electrode of the second biased neon bulb and the bulbs are spaced apart such that the DC bias current flows in a first direction from the first electrode of the first biased neon bulb to the second electrode of the first biased neon bulb and then in a second direction opposite to the first direction from the first electrode of the second biased neon bulb to the second electrode of the second biased neon bulb; and detecting the wave-potential signal further comprises orienting the wave-potential detector such that the first direction and the second direction are substantially parallel to the direction of propagation of the wave-potential signal.

In some embodiments, the method further comprises matching an output of the wave-potential detector to radio receiver circuitry using a balun.

According to still a further broad aspect of the present invention, there is provided a wave-potential receiver comprising: a wave-potential detector comprising at least one electron-beam device configured to operate with a current with at least a portion of the current substantially parallel to a direction of propagation of a wave-potential signal having a longitudinally polarized A vector; and radio receiver circuitry that processes a received signal induced in the wave-potential detector by the wave-potential signal.

According to yet a further broad aspect of the present invention, there is provided a method for detecting a wave-potential signal with a longitudinally polarized A vector comprising: detecting the wave-potential signal with at least one electron-beam device having a current with at least a portion of the current substantially parallel to a direction of propagation of the wave-potential signal.

Other aspects and features of the present invention will become apparent, to those ordinarily skilled in the art, upon review of the following description of the specific embodiments of the invention.

BRIEF DESCRIPTION OF THE DRAWINGS

Embodiments of the invention will now be described in greater detail with reference to the accompanying diagrams, in which.

In the drawings, the same reference characters have been used throughout the drawings to identify the same or similar elements.

DETAILED DESCRIPTION

Figure 1:
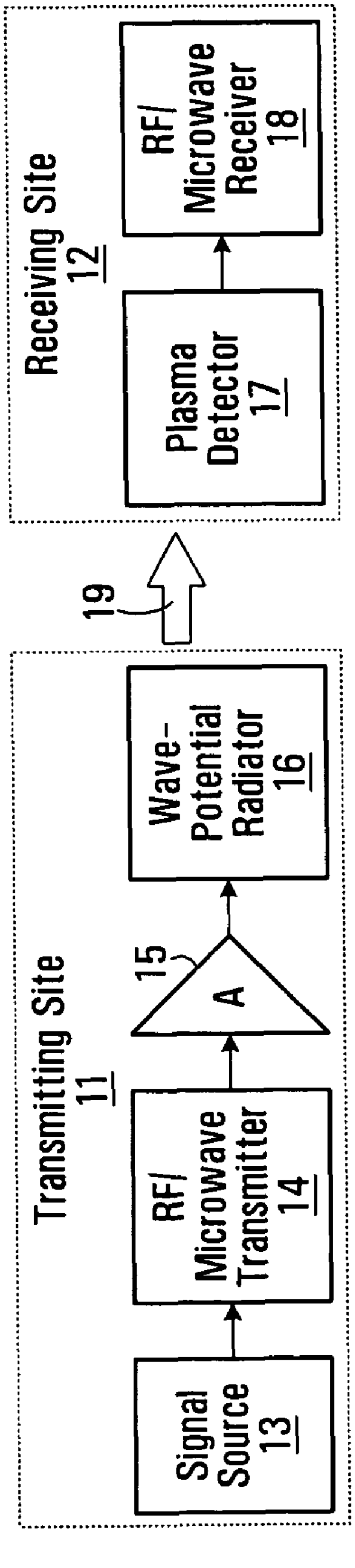
FIG. 1 is a block diagram of a communication system according to an embodiment of the present invention, in which the transfer of information is carried out using longitudinal high-frequency potential waves.

In the following detailed description of sample embodiments of the invention, reference is made to the accompanying drawings which form a part hereof, and in which is shown by way of illustration specific sample embodiments in which aspects of the invention may be practiced. These embodiments are described in sufficient detail to enable those skilled in the art to practice the invention, and it is to be understood that other embodiments may be utilized and that logical, mechanical, electrical, and other changes may be made without departing from the scope of the invention. The following detailed description is, therefore, not to be taken in a limiting sense, and the scope is defined by the appended claims.

As noted above, there are cases, where, for a particular antenna or another type of electromagnetic source, the field force vectors can be reduced to zero or near-zero in parts or sectors of space (or even all space) while the components of the 4-vector potential are significantly different from zero. This invention is proposing a means of communication through such "zero-field" signals by supplying the necessary power locally at the receiver. These signals are referred to herein as wave-potential signals.

Embodiments of the present invention provide means of communicating information over large distances through high-frequency electromagnetic 4-vector potential waves (the magnetic vector potential A and the electric scalar potential Φ), rather than field force vectors (the electric intensity vector E and the magnetic induction B).

Embodiments of the present invention provide a system that is capable of detecting and measuring RF and microwave signals carried solely by waves of the electrodynamic potentials.

The wave-potential signals, whose associated field vectors E and B are zero, cannot be detected with conventional antennas. Thus, embodiments of the present invention provide means of communicating information through channels, which operate in the same frequency bands as those of conventional RF and microwave communication links, but do not interfere with them. The wave-potential communication systems allow for the doubling of the available frequency spectrum, which is a valuable and heavily regulated commodity in modern communication technology.

Embodiments of the present invention also provide wave-potential transmission devices ("Hedgehog" radiator and a longitudinal dipole backed by a parabolic dish) which suppress the field intensity vectors (E,B) while maximizing the potential waves. This is achieved by generating potential waves where the A vector is longitudinally polarized, i.e., it is polarized along the direction of propagation. Under such conditions, the wave-potential transmitter requires negligible energy since the potential wave carries no real power, i.e., its Poynting vector is zero. The power required to detect such a wave is provided locally at the receiver. This solution is especially economical for communication systems where there is a single broadcasting transmitter and a large, generally unpredictable, number of receivers (or users), e.g., radio and television broadcasting. Then, the energy needed for signal reception is provided by the user locally, i.e., at the point of reception, only when and where the signal is needed.

Embodiments of the present invention also provide means of wave-potential detection (plasma detectors), which provide high sensitivity to wave-potential signals while rejecting real-power (E,B) signals through a bias switch or through a differential plasma detector.

One aspect of the invention is the communication through time-varying waves of the four-potential (A,Φ) over a large distance between a transmitting site and a receiving site using radio and microwave frequencies. The electric and magnetic field vectors E and B in the transmitted signal are suppressed by properly designing the transmitting device. The transmitting devices in accordance with embodiments of the present invention provide long-distance information transfer utilizing high frequencies. To accomplish this, the vector potential A of the potential wave is longitudinally polarized rather than orthogonally polarized with respect to the direction of propagation.

Another aspect of the invention discloses high-frequency transmitting devices, which generate potential waves with minimal field vectors in the far zone. The potential wave amplitude and/or phase variation with time is in accordance with the transmitted information. The polarization of the A-potential is longitudinal, i.e., along the direction of propagation, which provides zero far-zone E and B field vectors. In contrast, if a magnetic vector potential A, whose polarization is perpendicular to the direction of propagation, were generated, it would lead to a non-zero (E,B) field in the far-zone of the device.

The third aspect of the invention provides receiving devices based on partially ionized plasmas such as the plasmas in ionized fluorescent tubes and neon bulbs, which are currently in wide use as lighting sources and electronic indicators, which are described in G. G. Lister, J. E. Lawler, W. P. Lapatovich, and V. A. Godyak, "The physics of discharge lamps," *Reviews of Modern Physics*, vol. 76, April 2004, pp. 541-598, and K. H. Loo, G. J. Moss, R. C. Tozer, D. A. Stone, M. Jinno, and R. Devonshire, "A dynamic collisional-radiative model of a low-pressure mercury-argon discharge lamp: a physical approach to modeling fluorescent lamps for circuit simulations," *IEEE Trans. Power Electronics, vol.* 19, No. 4, July 2004, pp. 1117-1129, which are hereby incorporated by reference in their entirety. These are referred to herein as potential-wave plasma detectors. Such detectors do not require heavy and expensive cryogenic chambers. They do not require electromagnetic shielding either since the interference from the conventional (E,B) field is eliminated through: (1) either a switch in the bias polarity for a single plasma device; (2) or the construction of plasma differential detector from two devices biased in series and oriented so that their bias currents are anti-parallel.

In general, a potential-wave plasma detector can be implemented by any device that includes a biased plasma with a bias current sensitive to wave-potential signals and that flows in a direction that is substantially parallel to a direction of propagation of a wave-potential signal that is to be detected. That is, the direction of current flow is in the same direction as the direction of propagation or in the opposite direction.

The amplitude of the RF/microwave signal induced in the plasma detector is proportional to the amplitude of the potential wave, which induces it; however, its power is supplied by the local bias source. Thus, the plasma detector acts as a DC-to-RF power converter controlled by the wave potential signal. The frequency of the RF/microwave signal induced in the plasma detectors is the same as that of the potential wave.

The wave-potential communication system can make use of all amplitude and phase modulation techniques currently used in conventional RF/microwave links. One advantage of the wave-potential receiver is that the strength of the RF or microwave signal can be regulated through the strength of the bias current within the limits of the allowed bias-current values for the particular device.

The communication method in accordance with an embodiment of the present invention provides a long-distance high-frequency communication link. The apparatus in accordance with an embodiment of the present invention includes receiving plasma detectors, while the transmitting devices are electrically large, i.e., comparable or larger than the wavelength of the signal to be transmitted, and generate longitudinal potential waves in the far zone. The transmitting devices generate a potential wave whose A vector is longitudinally polarized with respect to the direction of propagation for a large sector of space, thereby ensuring suppressed (E,B) field in the far-zone of this sector of space.

As mentioned above, one advantage of some embodiments of the present invention is the potential re-use of the RF and microwave spectrum, which is in high demand in modern communication systems and is strictly regulated.

Another advantage of some embodiments of the present invention is the significant reduction of power as compared to the power used by the transmitters in conventional wireless communications links, such as conventional RF links or microwave links. This is especially important in broadcasting applications such as television and radio, where transmission stations may use up to several hundreds of kilowatts of power regardless of the number of "listening" receiving stations. This power is wastefully dispersed throughout space with only a miniscule fraction of it being intercepted by active receiving stations. The power savings are important for mobile and satellite transmitters as well where stable and lasting sources of electric power are not readily available. The proposed system delivers the signal at the power expense of the receiving station, therefore, only when and where the information is needed.

A communication system in accordance with an embodiment of the present invention will now be described with reference to FIG. 1. The communication system illustrated in FIG. 1 consists in general of a transmitting site 11 and a receiving site 12 separated by an electrically large distance such that it is more than several wavelengths of a transmitted longitudinal 4-potential wave signal 19. The 4-potential wave signal 19 travels in open space providing the link between the two sites 11,12.

The transmitting site 11 comprises a signal source 13 such as a microphone, a digital device or a video camera. The signal source 13 may involve additional post-processing steps on an original signal such as coding or noise-reduction. The transmitting site 11 also includes a wireless transmitter 14, which may be, for example, an RF transmitter or a microwave transmitter. The transmitter 14 includes conventional circuitry: an oscillator generating a carrier waveform; a modulator, which superimposes the signal output of the signal source 13 onto the carrier waveform in accordance with the desired modulation scheme; and filters ensuring proper spectral content in accordance with bandwidth regulations. In the illustrated system, the conventional power amplifier, which is present in RF/microwave transmitters, and which is usually matched to a 50-Ω system impedance, is replaced by a current-driving amplifier 15, which is matched to a wave-potential radiator 16 whose impedance (reactance and resistance) is very low. This is due to the zero-power property of the longitudinal 4-potential wave signal 19 and the desirable suppression of the (E,B) vectors.

The receiving site 12 comprises a plasma detector 17, which acts as a DC-to-RF power converter controlled by the received 4-potential wave signal 19. The recovered high-frequency signal is processed by a conventional wireless receiver 18, which may be, for example, an RF receiver or a microwave receiver, and which performs down-converting, mixing, demodulation and, if necessary, de-coding.

Figure 2:
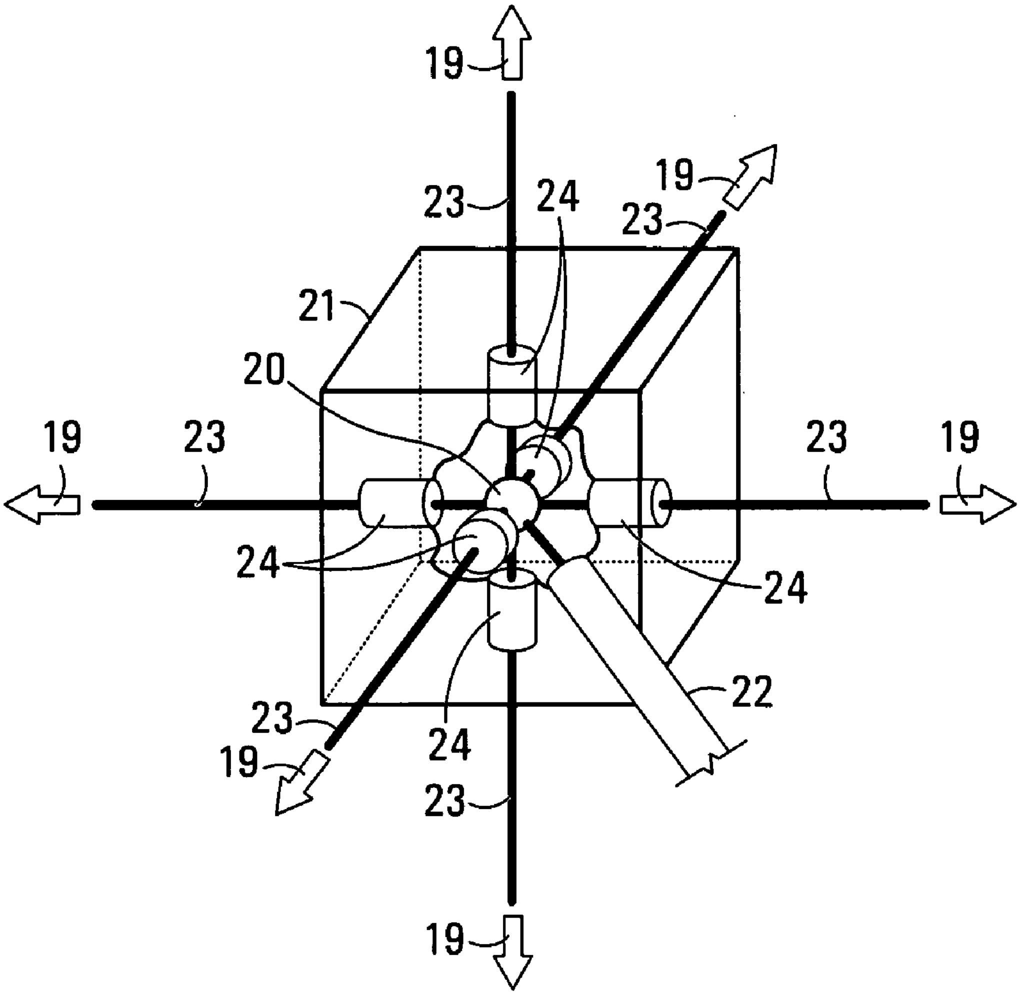
FIG. 2 is a perspective view of a wave potential radiator, referred to as a Hedgehog radiator, according to an embodiment of the present invention.

In FIG. 2, an embodiment of a potential-wave radiator is shown. This embodiment is referred to as the Hedgehog radiator, as it includes three pairs of diametrically opposed radial electrical conductors formed by six metallic wires 23 radiating out from a central point 20, such that the radial electrical conductors have a 3-dimensional symmetry. One advantage of this embodiment is that the potential wave 19 radiated by the radiator is omnidirectional, which potentially makes this embodiment especially suitable in broadcasting applications. The six metallic wires 23 of the three pairs of radial electrical conductors are fed with a signal drive current from the center point 20 in phase. The radiator also includes an enclosing box 21, which is made from a conductive material such as metal, and which is connected to ground, for example through the shield of a coaxial feed line 22 connected to the center point 20. The six radiating metallic wires extend from the center conductors of six short matching coaxial sections 24 that are electrically connected to the center point 20. These matching sections are inside the electrically conductive box 21, their shields being connected to ground as well. The purpose of the six short matching coaxial sections 24 is to ensure even distribution of the current to all six wires with little impedance. Due to symmetry in 3-dimensional space, the Hedgehog potential-wave radiator potentially has negligible radiated power signal, i.e., the far-zone (E,B) field vectors are essentially zero; therefore, it has very low impedance.

The shape of the enclosing box 21 need not be cubical, as shown in FIG. 2, but may be spherical or octahedral or any symmetrical polyhedron in some embodiments. The spherical shape may provide the best symmetry of the radiated potential waves 19 and the least parasitic far-zone (E,B) field, but may be more difficult to fabricate.

An octahedral enclosing box (not shown) has the shape of two identical pyramids joined at a common square base. It has six vertices, equidistant from the center of the structure, and eight identical triangular faces. It may offer comparable performance to that of the spherical enclosure but may be easier to fabricate.

The size of the enclosing box 21 compared to the length of the radiating wires 23 may be selected to achieve a desired resistance and reactance. The size and shape of the enclosing box may be selected on the basis of simulation and/or trial and error. In some cases, simulation may be first used to obtain a rough size and shape and then experimental fine-tuning is performed to reach the desired resistance and reactance.

In some embodiments, the non-spherical enclosing box 21 is sized such that its edges are at a distance that is at least 5 times smaller than the length of the radiating wires 23. However, the size of the enclosing box is an implementation specific detail that depends on, for example, the shape of the enclosing box. In fact, the impedance of the radiator may be very sensitive to the edge length because the reactive near-zone field is generally very sensitive to the shape of the box.

Figure 3:
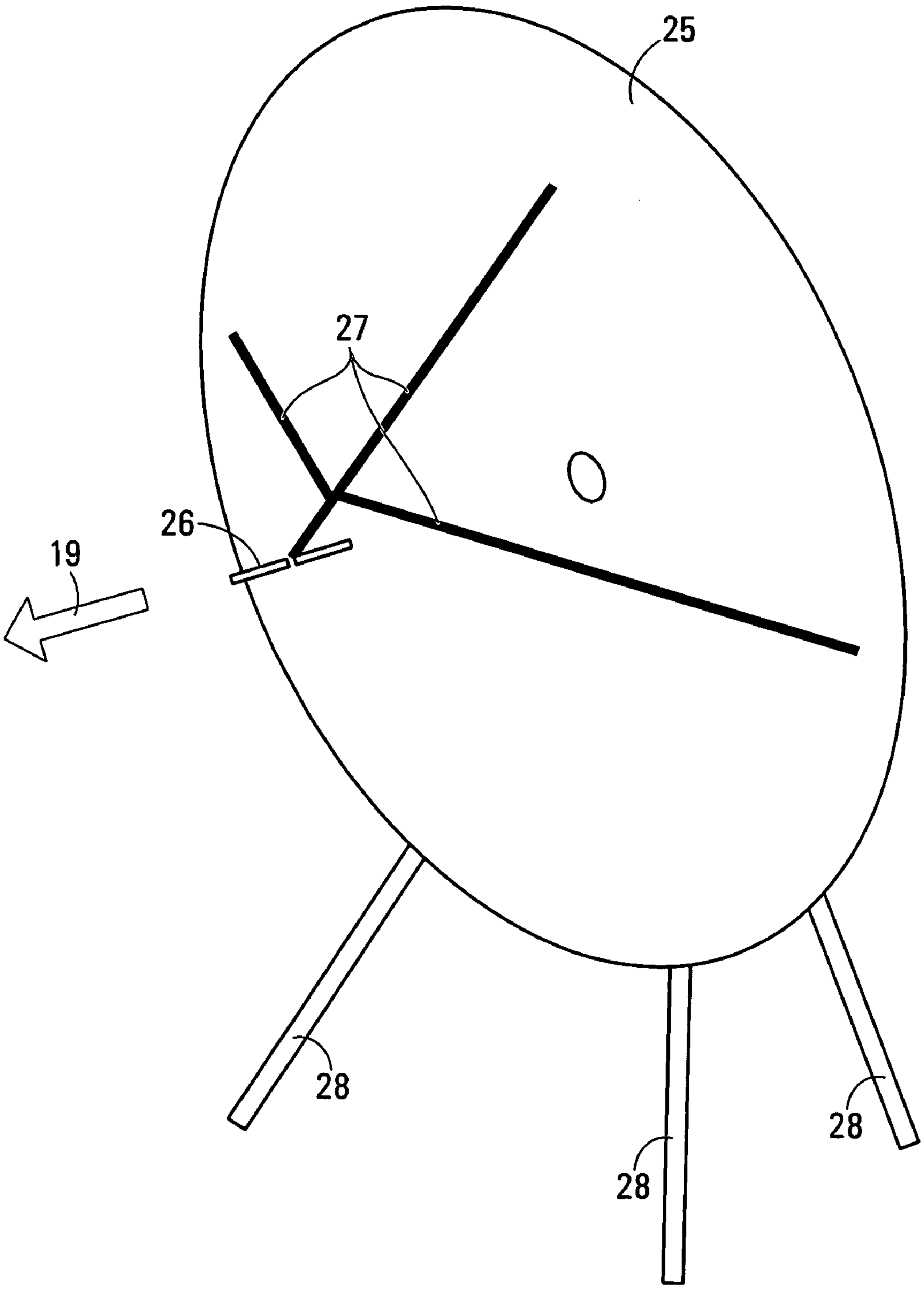
FIG. 3 is a perspective view of another wave potential radiator, the longitudinal dipole backed by a parabolic reflector, according to an embodiment of the present invention.

While the six radial wires 23 extend through the six faces of the square (symmetrical polyhedron) enclosing box 21 in the embodiment shown in FIG. 3, in some embodiments the radial wires may extend through respective edges or vertexes of the enclosing box.

In some embodiments, the length of the six radial wires is about a quarter wavelength of the signal that is to be transmitted.

More generally, the diametrically opposed wires may individually be any length less than the wavelength of the signal that is to be transmitted.

Although the Hedgehog radiator illustrated in FIG. 2 includes three pairs of diametrically opposed radial electrical conductors for a total of six radial conductors, more generally a wave-potential radiator may include any number of pairs of diametrically opposed radial electrical conductors.

Another embodiment of a potential-wave radiator is shown in FIG. 3. It comprises a parabolic reflector 25 and a longitudinally oriented dipole 26 with a center that is located at the focal point of the parabolic reflector. Non-conductive struts 27 are used to support the dipole 26. Non-conductive struts 28 are used to support the parabolic reflector 25. Alternatively, the support struts 28 may be conductive, but in that case must be electrically isolated from the parabolic reflector 25. One advantage of this embodiment of a potential-wave radiator is the high directivity of the far-zone pattern of the transmitted wave-potential signal 19. Thus, this embodiment may be preferable in communication links where there is a single receiver with a known location, i.e., point-to-point communication.

In some embodiments, the total length of the dipole element is approximately ½ a wavelength of the transmitted wave-potential signal. Generally, the parabolic reflector 25 is electrically large; that is, its radius is many times larger than the wavelength of the transmitted wave-potential signal 19. In general, the larger the reflector, the narrower the beam of the transmitted wave-potential signal 19.

Figure 4:
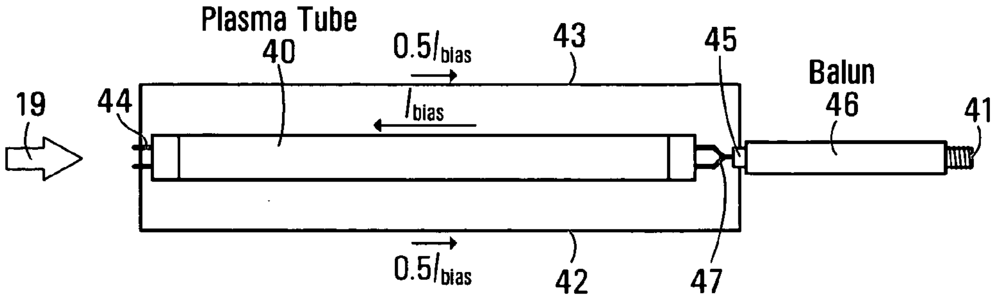
FIG. 4 is a cross-sectional view of a plasma detector using a biased fluorescent tube in accordance with an embodiment of the present invention.

One embodiment of a plasma wave-potential detector is shown in FIG. 4. It consists of a DC-biased plasma tube 40. In order to intercept a wave-potential signal, the tube is oriented along the direction of polarization of the magnetic vector potential A, which is also the direction of propagation of a longitudinal wave-potential signal 19. The biased plasma tube 40 has a first termination 47 at one end and a second termination 44 at its other end. Two parallel metallic wires 42 and 43 are symmetrically located on either side of the plasma tube 40 and connect the second termination 44 of the plasma tube 40 to the coaxial shield 45 of a Sub-Miniature A (SMA) connector 41. The SMA connector 41 has a center conductor that is connected to the first termination of the plasma tube 40.

In some embodiments, a Balun 46 is provided between the first termination end 47 of the plasma tube 40 and the SMA connector 41 to improve matching between the coaxial feed at the SMA connector 41 and the plasma tube termination 47. The embodiment illustrated in FIG. 4 includes the Balun 46 and the return wires 42 and 43 connect the second termination end 44 of the plasma tube 40 to the coaxial shield at the connection between the balun 46 and the first termination end 47 of the plasma tube 40.

In operation, the detector acts as a converter of the supplied DC power into an RF signal where the magnitude and phase of the recovered RF signal is controlled by the magnitude and phase of the potential wave 19. The recovered RF signal appears between the termination 47 at the first end of the biased plasma tube 40 and the coaxial shield 45. The detector is ignited to achieve plasma state; thereafter, the plasma state is maintained by a DC current-controlled power supply (not shown) such that a DC bias current $I_{bias}$ travels through the plasma in a direction parallel or anti-parallel to the direction of polarization of the longitudinal wave-potential signal 19 that is to be detected. The recovered RF or microwave signal is fed to an RF or microwave receiver, such as the receiver 18 shown in FIG. 1. The strength of the recovered RF signal can be controlled through the strength of the bias current $I_{bias}$ as long as the bias current is within the limits necessary to operate the device safely. The DC bias current $I_{bias}$ is supplied to the first termination 47 at the first end of the plasma tube 40 through an RF feed line that includes the Balun 46 connected to the SMA connector 41. A return path for the bias current $I_{bias}$ is provided by the two parallel metallic wires 42 and 43, such that half of the bias current, i.e., $0.5\times I_{bias}$, is returned through each return path through the metallic wires 42 and 43. Such arrangement suppresses interference from conventional power (E,B) RF signals since the ignited plasma tube 40 together with the return wires 42 and 43 forms two conducting loops whose RF signals cancel.

In some embodiments, the length of the DC-biased plasma tube is about a quarter of a wavelength of the wave-potential signal.

More generally, the DC-biased plasma tube may be any length less than the wavelength of the wave-potential signal.

Figure 5:
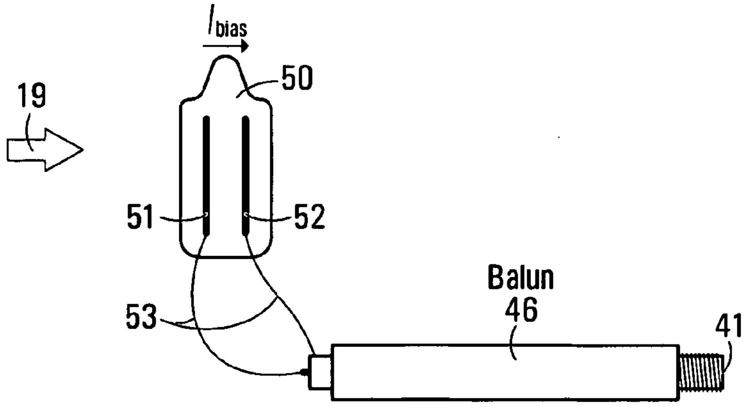
FIG. 5 is a cross-sectional view of a plasma detector using a biased neon bulb in accordance with an embodiment of the present invention.

Another embodiment of a plasma detector is shown in FIG. 5. It consists of a DC-biased neon bulb 50. In order to intercept a wave-potential signal 19, the neon bulb 50 is oriented so that the axis passing through its electrodes 51 and 52 is along the direction of polarization of the magnetic vector potential A, which is also the direction of propagation of the longitudinal wave-potential signal 19. Since the neon bulb 50 is electrically very small, i.e., less than 1/10 of the wavelength of the wave-potential signal 19, it is a very inefficient antenna for conventional power (E,B) RF signals. Therefore, it does not need special arrangements of the wires 53 forming the DC bias path. The recovered signal is fed to a RF or microwave receiver, such as the receiver 18 shown in FIG. 1, in the same manner as in the case of the DC-biased plasma tube 40 shown in FIG. 4. One advantage of the neon-bulb detector is its high sensitivity, which compensates for its small size and, therefore, small volume where the plasma and the wave-potential signal 19 interact. Another advantage is that it is electrically small and can be placed precisely at the focal point of a parabolic reflector to provide a high-gain link.

Neon bulbs are generally more sensitive to wave-potential signals than fluorescent tubes because they generally achieve greater ionization rates, that is, there are generally more ions/electrons per unit volume in neon plasma than in the typical argon-mercury plasma of fluorescent tubes. In addition, neon plasma bulbs generally require less DC bias current to maintain their plasma state, so that power consumption can potentially be reduced by using a neon plasma-based detector rather than a fluorescent tube-based detector.

In some embodiments, a traditional RF antenna may also be provided as part of the wave-potential detectors shown in FIG. 4 and FIG. 5 in order to allow the interference from conventional RF (E,B) fields to be removed from the signal detected by the plasma detector so that the wave potential signal can be extracted from the signal detected by the plasma detector. Specifically, the RF signal detected by the traditional RF antenna is scaled and subtracted from the total detected signal of the plasma detector, so that the RF interference is effectively removed.

Figure 6:
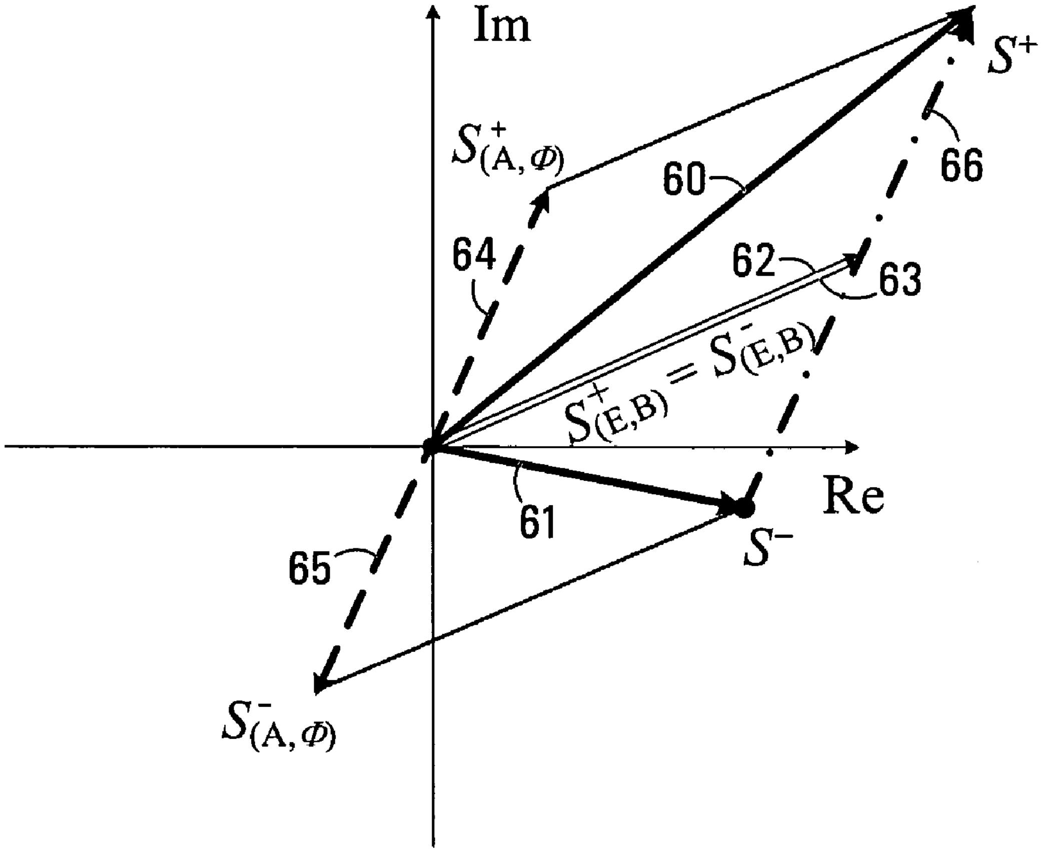
FIG. 6 is a vector diagram illustrating the differential detection technique according to an embodiment of the present invention, which allows for the separation of the wave-potential signal from the conventional (E,B) field signal.

The plasma detectors described in FIG. 4 and FIG. 5 are not completely insensitive to the conventional power RF signals with non-zero (E,B) vectors. However, the mechanism through which they respond to the non-zero (E,B) field is fundamentally different from the mechanism through which they respond to a wave-potential signal. Most importantly, the phase of the RF current induced by a wave-potential signal depends on the direction of the vector potential A with respect to the direction of the bias current $I_{bias}$. In particular, a switch in the polarity of the bias current $I_{bias}$ results in a change of the phase of the recovered high-frequency signal by π (180°). At the same time, the conventional RF (E,B) field signal, which a plasma detector may pick up, does not depend on the polarity of the bias current $I_{bias}$. Therefore, by performing two measurements, with a positive bias and with a negative bias, two signals are obtained, $S^+$ and $S^-$. With reference to FIG. 6, these two signals are represented by their respective vectors 60 and 61 in the complex plane. Each of them has a component, generally indicated at 62 and 63, respectively, which is due to a conventional non-zero (E,B) field, and a component, generally indicated at 64 and 65, respectively, which is due to the potential wave, i.e., $$S^+=S_{(E,B)}{}^+ + S_{(A,\Phi)}{}^+ \quad (1)$$

$$S^-=S_{(E,B)}{}^- - S_{(A,\Phi)}{}^- \quad (2)$$

As stated above, a signal due to a power-carrying (E,B) field does not depend on the direction of the bias current $I_{bias}$, which flows through the plasma. It depends solely on the plasma complex permittivity value, the latter being determined by the magnitude of the bias current. Thus, $$S_{(E,B)}^{+}=S_{(E,B)}^{-} \quad (3)$$

As noted above, this is shown in FIG. 6 by the respective identical vectors 62 and 63. At the same time, the signal due to the wave-potential signal changes its phase with a switch in the direction of the bias current $I_{bias}$, thus $$S_{(A,\Phi)}^{+}=-S_{(A,\Phi)}^{-} \quad (4)$$

As noted above, this is shown in FIG. 6 by the vectors 64 and 65, which point in opposite directions. As per (3) and (4), the subtraction of the two signals $S^{+}$ 60 and $S^{-}$ 61, cancels the (E,B) field signal and doubles the wave-potential signal. Mathematically, the desired wave-potential signal is obtained as $$S_{(A,\Phi)}=2S_{(A,\Phi)}^{+}=S^{+}-S^{-} \quad (5)$$

The signal ($S^{+}-S^{-}$) is shown by the vector 66 in FIG. 6.

Thus, the wave-potential signal can be extracted and the interference from conventional non-zero (E,B) fields can be eliminated by a simple switch in the polarity of the DC bias of the plasma detector.

Figure 7:
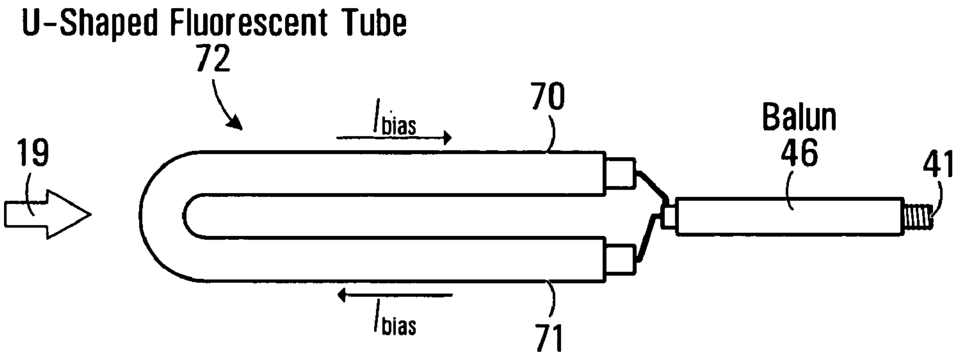
FIG. 7 is a cross-sectional view of a plasma differential detector, according to an embodiment of the present invention, consisting of a folded fluorescent tube whose two parallel arms are biased in series.

A practical way to implement the superposition of the two RF signals obtained with two opposite-polarity bias currents, as described in equation (5), is to bias two plasma devices in series and to place them parallel to each other, or to use a U-shaped plasma tube 72, as shown FIG. 7. The advantage of this differential arrangement is that there is no need to design electronic switches in the bias circuitry. The two plasma tubes, i.e., the two plasma columns 70 and 71 of the U-shaped plasma tube 72 shown in FIG. 7, are closely spaced to minimize the area of the loop formed by the two conducting plasma tubes/columns.

In some embodiments, the length of each plasma column is about a quarter of a wavelength of the wave-potential signal that is to be detected.

Figure 8:
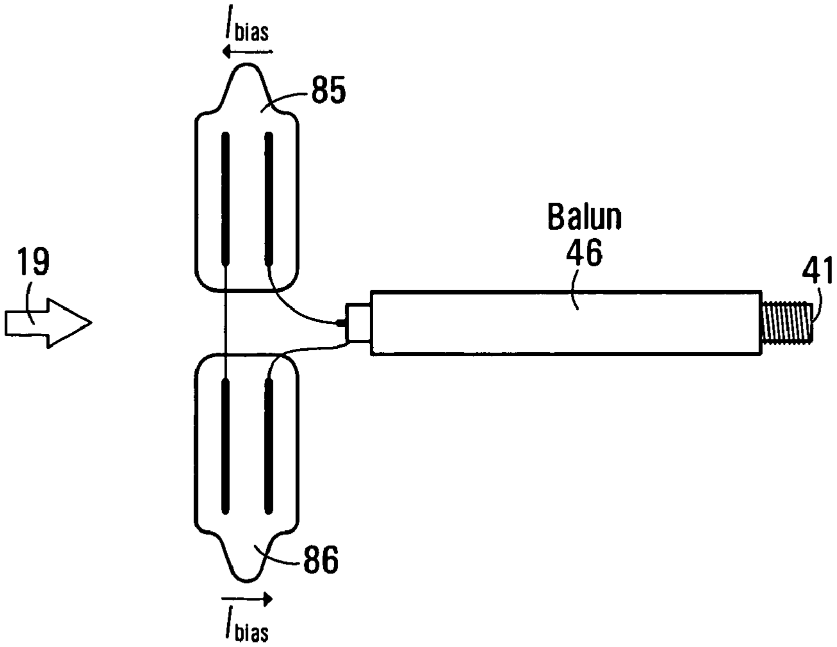
FIG. 8 is a cross-sectional view of a plasma differential detector, according to an embodiment of the present invention, consisting of two neon bulbs biased in series and oriented so that their bias currents are anti-parallel.

FIG. 8 shows analogous differential device consisting of two neon bulbs 85 and 86.

Figure 9:
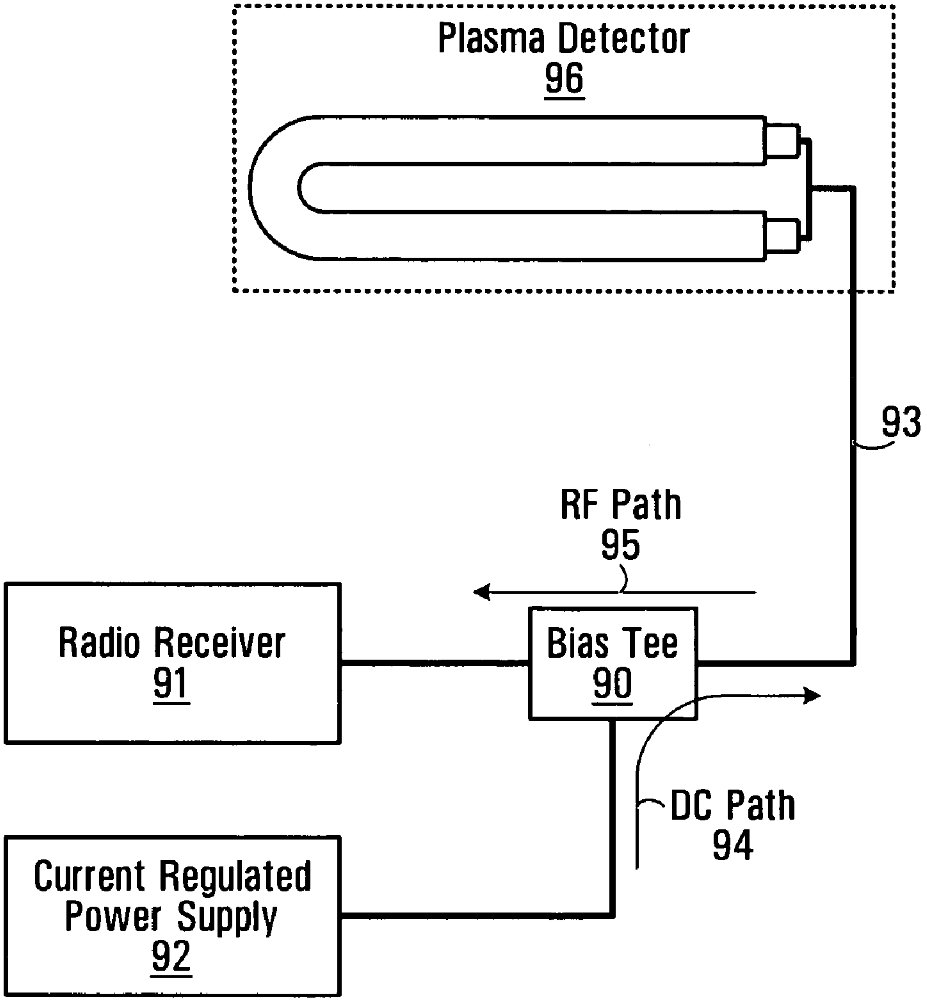
FIG. 9 is a block diagram of a biased plasma detector according to an embodiment of the present invention.

In some embodiments, a bias tee may be used to separate the DC bias path from the high frequency, i.e., RF or microwave, signal path at the output of a plasma detector. FIG. 9 shows an example of such an embodiment, in which the RF path 95 is separated from the DC path 94 by a bias tee 90. In the illustrated embodiment, the bias tee 90 is placed close to an RF or microwave radio receiver 91 and a current-regulated power supply 92, while a feed cable 93 is used to carry the DC power to a plasma detector 96 and the RF or microwave signal from it. The plasma detector 96 can be any of the devices shown in FIG. 4, FIG. 5, FIG. 7, or FIG. 8.

While the embodiments described above utilize biased plasma based detectors to receive wave-potential signals, more generally, wave-potential plasma detectors, such as the wave-potential detector 96 shown in FIG. 9 may be any device employing biased plasma or an electron beam where electrons are capable of acceleration in the direction parallel or anti-parallel to the magnetic vector potential A. Electron beam-based detectors may have the same potential in potential-wave detection as the gas-discharge technology, i.e., biased plasma detectors, described above, as the electron behavior in an electron beam is governed by similar equations as in low-temperature plasma. Accordingly, an RF signal carried by a wave-potential signal having a longitudinally polarized magnetic vector potential A may be induced in an electron beam-based detector should the electron beam be oriented parallel to the direction of propagation of the wave-potential signal. However, as noted above, most electron beam devices have heavy metal shielding and may not be practical in their present form. It may be possible that glass or ceramic shielding could be used to enclose an electron beam device such that the device could be made practical for the applications described herein.

In the embodiments described above, the device elements and circuits are connected to each other as shown in the figures, for the sake of simplicity. In practical applications of the invention, devices, elements, circuits, etc. may be connected or coupled directly to each other. As well, devices, elements, circuits etc. may be connected or coupled indirectly to each other through other devices, elements, circuits, etc., as necessary for operation.

The above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. A wave-potential receiver comprising:

a wave-potential detector comprising at least one biased plasma device configured to operate with a current with at least a portion of the current substantially parallel to a direction of propagation of a wave-potential signal having a longitudinally polarized A vector; and radio receiver circuitry that processes a received signal induced in the wave-potential detector by the wave-potential signal.

2. The wave-potential receiver according to claim 1, wherein the at least one biased plasma device has a longitudinal length less than the wavelength of the wave-potential signal.

3. The wave-potential receiver according to claim 1, wherein the at least one biased plasma device comprises a biased plasma tube, and the current comprises a DC bias current that biases the plasma tube.

4. The wave-potential receiver according to claim 3, wherein the biased plasma tube has a first end and a second end and the DC bias current flows from the first end to the second end on a first path and returns from the second end to the first end on a separate return path.

5. The wave-potential receiver according to claim 4, wherein the separate return path comprises two separate return paths located symmetrically on opposite sides of the biased plasma tube.

6. The wave-potential receiver according to claim 5, further comprising a shielded co-axial connector comprising a central conductor and a shield, wherein the first end of the biased plasma tube is connected to the central conductor of the shielded co-axial connector and the two separate return paths comprise electrical conductors connected between the second end of the biased plasma tube and the shield of the shielded co-axial connector.

7. The wave-potential receiver according to claim 1, wherein the at least one biased plasma device comprises a biased neon bulb comprising a first electrode and a second electrode having an axis therebetween, and the current comprises a DC bias current flowing along the axis between the first electrode and the second electrode.

8. The wave-potential receiver according to claim 1, wherein the at least one biased plasma device comprises a biased u-shaped plasma tube having a first leg and a second leg that are parallel to one another, each leg having a first end and a second end, wherein the second end of the first leg and the second end of the second leg are joined to form the u-shape, and the current comprises a DC bias current that flows from the first end of the first leg around the u-shaped plasma tube to the first end of the second leg.

9. The wave-potential receiver according to claim 8, further comprising a shielded co-axial connector comprising a central conductor and a shield, wherein the first end of the first leg is connected to the central conductor of the shielded co-axial connector and the first end of the second leg is connected to the shield of the shielded co-axial connector.

10. The wave-potential receiver according to claim 7, wherein the at least one biased plasma device comprises a second biased neon bulb having a first electrode and a second electrode having an axis therebetween, wherein the second electrode of the first biased neon bulb is electrically connected to the first electrode of the second biased neon bulb and the bulbs are spaced apart such that the DC bias current flows in a first direction from the first electrode of the first biased neon bulb to the second electrode of the first biased neon bulb and then in a second direction opposite to the first direction from the first electrode of the second biased neon bulb to the second electrode of the second biased neon bulb, the first direction and the second direction being parallel to the direction of propagation of the wave-potential signal when the wave-potential detector is oriented with respect to the direction of propagation of the wave-potential signal.

11. The wave-potential receiver according to claim 1, further comprising a balun to improve matching between the at least one biased plasma device and the radio receiver circuitry.

12. The wave-potential receiver according to claim 1 wherein the radio receiver circuitry switches the polarity of the current to the wave-potential detector between a first polarity and a second polarity and takes the difference between a received signal received during the first polarity from a received signal received during the second polarity to suppress real-power (E,B) signal interference.

13. The wave-potential receiver according to claim 1, further comprising a real-power (E,B) radio frequency antenna that detects real-power (E,B) radio frequency signals, wherein the radio receiver circuitry scales and subtracts any detected real-power (E,B) radio frequency signal received from the real-power (E,B) radio frequency antenna from the received signal from the wave-potential detector.

14. The wave-potential receiver according to claim 1, wherein the radio receiver circuitry down-converts, mixes and demodulates the received signal.

15. The wave-potential receiver according to claim 14, wherein the radio receiver circuitry also de-codes the received signal.

16. The wave-potential receiver according to claim 1, further comprising a current regulated power supply that supplies the current to the wave-potential detector.

17. The wave-potential receiver according to claim 16, further comprising a bias tee to apply the current from the current regulated power supply to the wave-potential detector and pass the received signal from the wave-potential detector to the radio receiver circuitry.

18. The wave-potential receiver according to claim 16, wherein the radio receiver circuitry controls the current regulated power supply to control the amount of current through the at least one biased plasma device and thus the strength of the received signal.

19. A method for detecting a wave-potential signal with a longitudinally polarized A vector comprising:

detecting the wave-potential signal with at least one biased plasma device having a current with at least a portion of the current substantially parallel to a direction of propagation of the wave-potential signal.

20. The method according to claim 19, wherein:

the at least one biased plasma device comprises a biased plasma tube;

the current comprises a DC bias current; and detecting the wave-potential signal comprises detecting a radio frequency (RF) signal induced in the biased plasma tube by the wave-potential signal.

21. The method according to claim 19, wherein:

the at least one biased plasma device comprises a biased neon bulb comprising a first electrode and a second electrode having an axis therebetween;

the current comprises a DC bias current flowing along the axis between the first electrode and the second electrode; and detecting the wave-potential signal comprises detecting a radio frequency (RF) signal induced in the biased neon bulb by the wave-potential signal.

22. The method according to claim 21, wherein:

the at least one biased plasma device comprises a second biased neon bulb having a first electrode and a second electrode having an axis therebetween;

the second electrode of the first biased neon bulb is electrically connected to the first electrode of the second biased neon bulb and the bulbs are spaced apart such that the DC bias current flows in a first direction from the first electrode of the first biased neon bulb to the second electrode of the first biased neon bulb and then in a second direction opposite to the first direction from the first electrode of the second biased neon bulb to the second electrode of the second biased neon bulb; and detecting the wave-potential signal further comprises orienting the wave-potential detector such that the first direction and the second direction are substantially parallel to the direction of propagation of the wave-potential signal.

23. The method according to claim 19, wherein:

the at least one biased plasma device comprises a biased u-shaped plasma tube having a first leg and a second leg that are parallel to one another, each leg having a first end and a second end, wherein the second end of the first leg and the second end of the second leg are joined to form the u-shape;

the current comprises a DC bias current that flows from the first end of the first leg around the u-shaped plasma tube to the first end of the second leg; and detecting the wave-potential signal comprises detecting a radio frequency (RF) signal induced in the u-shaped plasma tube by the wave-potential signal.

24. The method according to claim 19, further comprising matching an output of the wave-potential detector to radio receiver circuitry using a balun.

* * * * *